Patented Aug. 7, 1951

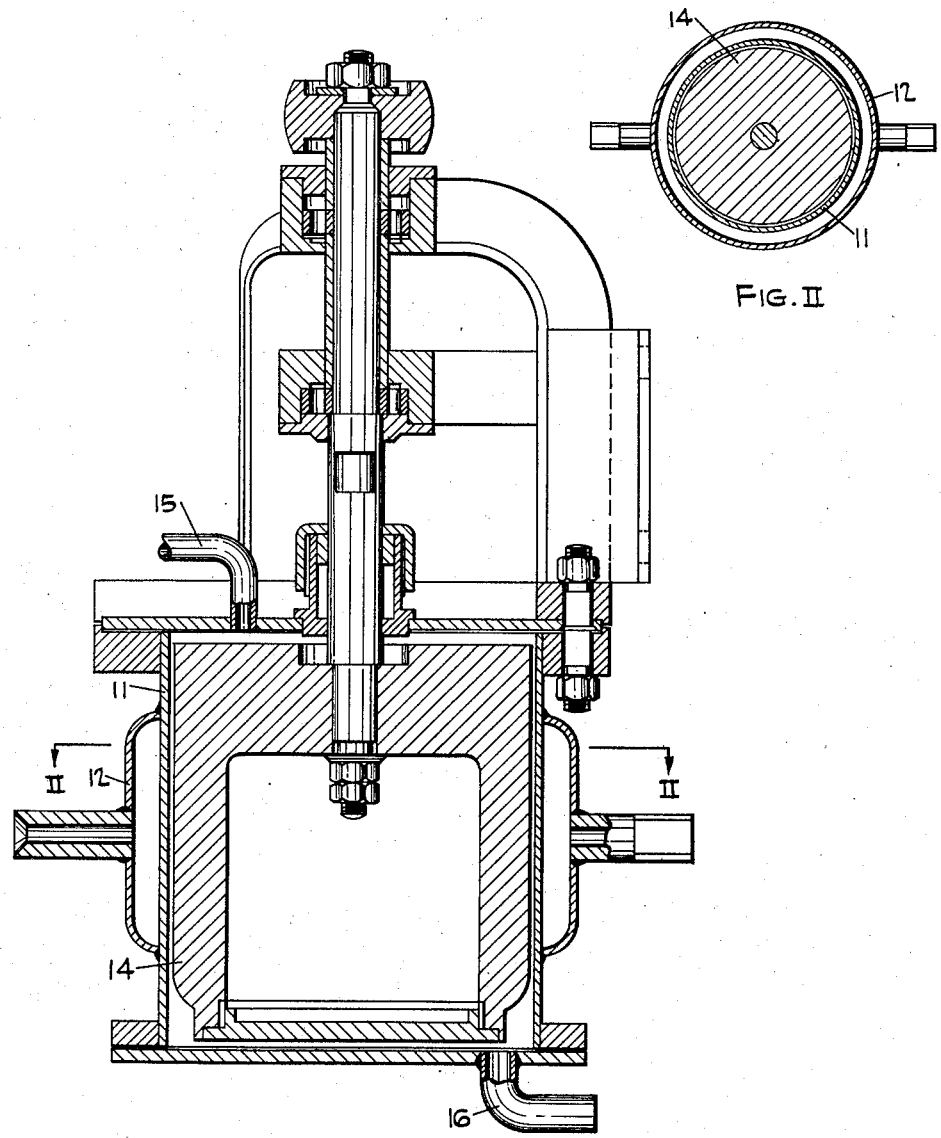

2,563,055

UNITED STATES PATENT OFFICE 2,563,055

COAGULATION OF COLLOIDAL DISPERSIONS

Rudolf Herman Mettivier Meyer and Jacob Dijkstra, Amsterdam, Netherlands, assignors to Shell Development Company, San Francisco, Calif., a corporation of Delaware Application December 26, 1947, Serial No. 794,130
In the Netherlands May 18, 1946

8 Claims. (Cl. 260—86.3)

This invention relates to the coagulation of colloidal dispersions. More particularly, it relates to a process for preparing dispersions of high-molecular weight substances with coarse particles starting from dispersions thereof with smaller particles. Starting from mechanically stable, fine dispersions, such as are formed, for instance, in the emulsion polymerization of polymerizable organic substances, the invention is directed more specifically to the preparation, from such polymerization emulsions or dispersions, of particles which are so coarse as to ensure their easy separation from the dispersion medium.

Heretofore, in the process known for the emulsion polymerization of polymerizable organic substances, such as vinyl compounds and the like, the working up of the polymer or copolymer suspensions has usually been effected by adding to these suspensions a suitable coagulation agent, particularly an electrolyte, such as aluminum sulfate, after which the coagulated polymer or copolymer has been separated from the liquid phase dispersion medium, for example by filtration. However, a principal disadvantage associated with this method of coagulation, is that the polymers or copolymers obtained thereby are contaminated with the coagulation agent utilized, or with products formed therewith, for instance by conversion or reaction with emulsifier, so that it is very difficult to free the coagulated polymer and/or copolymer therefrom. An important disadvantage of other usual methods of working up of the dispersion, such as by freezing out or by atomizing the suspension, is that they are not sufficiently economical.

It is a principal object, therefore, of the present invention to provide an improved method for the coagulation of colloidal dispersions. A further object is to provide a method of coagulating colloidal dispersions without at the same time contaminating the resulting coagulated material. A more specific object is to provide an improved method for the coagulation of fine dispersions of polymers and/or copolymers of polymerizable organic substances, which method avoids the contamination of the coagulated material by chemical coagulants. These objects will be more clearly understood and other objects will become evident from the description of the invention, made in part with reference to the accompanying drawing wherein:

Fig. I is a part vertical cross-sectional and part front elevational lengthwise view of a preferred apparatus for the practice of the invention, and Fig. II is a cross-section of Fig. I, taken along the line II—II.

Now, in accordance with the present invention, a method is provided for effecting in a simple manner, without the addition of chemicals, a purely mechanical coagulation of the finely dispersed particles present in mechanically stable dispersions stabilized by ion-active emulsifiers. By mechanically stable dispersions are meant here dispersions which do not coagulate in the well-known stirring test which is usually applied in the rubber industry as a means of controlling the mechanical stability of dispersions. It has now been found that by subjecting such a stable dispersion stabilized by an ion-active emulsifier to a high velocity gradient a coagulation of the fine particles to coarser aggregates takes place, which coagulation or aggregation may even proceed to such an extent that the aggregates formed can be separated from the dispersing liquid phase, e. g. by filtration.

Described generally, the invention provides a process for preparing dispersions of high-molecular substances with coarser particles starting from mechanically stable dispersions with smaller particles, which dispersions are stabilized by ion-active emulsifiers, which process is characterized by the dispersion being subjected to a high velocity gradient until the dispersed particles have reached the desired size, after which they may contingently be separated from the dispersing phase.

In practicing the invention, the initial fine dispersion may, for instance, be subjected to a high velocity gradient by causing the dispersion to pass through a narrow space, one confining wall of which moves with a very high velocity as compared with any motion of the opposite confining wall placed at close range with respect thereto.

The magnitude of the velocity gradient applied according to the invention, which is required for the desired purpose, is dependent on various factors, such as the type and stability of the initial dispersion, the average particle size of the dispersed phase which it is desired to attain, the type and amount of emulsifier which may be present, the specific characteristics of the dispersion medium such as viscosity and the like, and also the temperature at which the process is carried out.

In order to obtain a sufficient coagulation in dispersions of high-molecular weight substances, which dispersions have been previously stabilized by an ion-active emulsifying or stabilizing agent, the velocity gradient applied, expressed in sec.$^{-1}$ and calculated for a laminar flow, should be at least about 5000, preferably at least 10,000. By velocity gradient is meant the ratio of (1) the difference in the linear velocity of the one confining wall or surface to that of the other surface to (2) the distance between the two surfaces. From the above definition of what is meant by the velocity gradient, it is seen that the velocity gradient may be increased either (1) by increasing the velocity of one confining surface relative to that of the other, or (2) by decreasing the distance separating the two opposing surfaces which define the treating zone. Though the calculation of the velocity gradient is based upon the assumption of laminar flow, it should be borne in mind that in reality with velocity gradients as applied the type of flow is highly turbulent.

The period during which the initial dispersion must be subjected to the high velocity gradient in accordance with the invention may vary over a wide range, depending on the temperature applied, the composition and properties of the initial dispersion, the degree of coagulation desired and the magnitude of the velocity gradient. In general, this period of treatment may be selected shorter according as the velocity gradient to which the dispersion is subjected is made higher.

For preparing dispersions from which the dispersed particles may be easily separated by filtering, with a definite velocity gradient and temperature, the sojourn time of the dispersion in the space or zone in which the velocity gradient occurs should be chosen such as to cause the average particle size, which originally amounted to, for instance, 0.2 micron, to have increased to higher than approximately 2.5 microns after the treatment, for example to 4 to 6 microns, or even considerably higher.

The aggregated or coagulated particles resulting from the application of the invention may be separated from the dispersion medium by various ways as will be understood in the art. The separation may, for example, be effected by filtration, centrifugation, in some cases by sedimentation, etc.

The process may be carried out at different temperatures, such as normal as well as at lowered or elevated temperatures. In general, it has been found to be advantageous to effect the coagulation at more or less elevated temperatures, for instance, from about 50° C. to about 100° C., since, by utilizing elevated temperatures the coagulation is effected more rapidly, other conditions of operation being the same. In the case of aqueous suspensions of polyvinyl chloride, for example, very favorable results were obtained when the process was carried out at temperatures of from 80° C. to 90° C.

An important advantage realized in the practice of this invention, as compared with the hitherto usual working-up processes, is that the separated emulsifier solution in the dispersion medium may be reintroduced directly into the polymerization process, since this separated emulsifier solution does not contain any chemical coagulating agent, which, of course, would counteract the action of the emulsifier. This represents an advantage of considerable economical value. Not only is the separated emulsifier solution recoverable in a form in which it may be reused without further treatment; but, the coagulate which is obtained may be more easily and completely freed of impurities, such as the emulsifier and polymerization-catalyst remnants, which is of very great importance for the quality of the final product, in view of many of its applications.

In carrying out the process of the present invention, it is of advantage to use an apparatus consisting of a housing provided with a supply and discharge arrangement and containing one or more movable bodies, the surfaces of which are at short distances from the inner surface of the housing. A very suitable apparatus for the purpose is shown in Fig. 1, and consists of a cylindrical housing 11, provided with a jacket 12 into which a heating agent may be passed, the housing containing a cylindrical body 14 capable of rotating at great speed and having a diameter only slightly smaller, for instance one millimeter or less, than the inner diameter of the housing. The initial dispersion which is to be treated is passed by way of a supply line 15 into the apparatus, in which the rotor is rotating at a high speed, for instance of 1400–2800 revolutions per minute. After the dispersion has passed through the narrow space between the rotor and housing and being subjected therein to high shearing stresses which cause the dispersed particles to coagulate, the coagulated dispersion leaves the apparatus via a discharge line 16.

Instead of the apparatus described above, the invention may be practiced by various modifications thereof. Thus, if the confining walls are circular in cross-sectional outline, they need not be cylindrical, but they may have any desired shape, such, for example, as conical or frustoconical, so that the width of the path of the liquid is varied at any desired rate and to any desired degree. Likewise, any or all of the walls confining the boundaries of the fluid dispersion passage may be moved and, if opposing walls are moved they may be moved in the same or opposite directions just so long as a high velocity gradient is maintained, as already defined. Another type of apparatus which may also be used is one in which rapidly rotating discs placed close together define a zone which has a high velocity gradient.

The process according to the invention is of primary importance for the coagulation of mechanically stable dispersions of high-molecular weight polymers and copolymers obtained in the polymerization of polymerizable substances such as vinyl chloride and the like, or in the copolymerization of polymerizable substances, for instance, vinyl chloride and/or vinylidene chloride with one or more additional polymerizable substances, which additional polymerizable substances may be free from polar elements or groups. Ion-active emulsifying agents are of two types, namely, anion-active emulsifying agents and cation-active emulsifying agents.

Examples of ion-active emulsifying agents are: alcohol sulfates, such as sodium cetyl sulfate; sulfonated long-chain aliphatic compounds, and salts thereof such as Turkey red oil, sodium salts of sulphonated mineral oils; complex nitrogenous compounds such as triethanolamine, cyclo hexyldiethanolamine, mono-ethanolamine, which compounds mostly are used in the form of their soaps with fatty acids; soaps such as ammonium oleate; cation-active nitrogenous compounds bound to mineral acids such as cetylpyridinium bromde, dimethylcetylammonium chloride; and many others.

It will be understood that to the dispersions to be treated in accordance with the present invention, substances such as heat- or light-stabilizers, colorants, plasticizers and the like, for example in the form of finely divided aqueous dispersions, may contingently be added.

The practice, utility and advantages of the invention will be more clearly understood from the following exemplary examples which are given for the purposes of illustration and are not to be construed as limiting the invention in any manner other than as set forth in the claims.

*Example I.*—An aqueous suspension of polyvinyl chloride of about 20 per cent concentration containing 2 per cent of ion-active emulsifier, and prepared in accordance with procedures well known in the art, was passed through a stainless steel coagulation apparatus of the cylindrical type described above and shown in Fig. I. The cylindrical housing, which was heated by hot water to about 80° C., had an inner diameter of 120 mm.; the diameter of the cylindrical body (rotor) rotating therein at a speed of 1700 revolutions per minute was 119 mm. The distance, therefore, between the inner wall of the housing and the rotor was 0.5 mm. The space formed between the housing and the rotor had a length of 120 mm. The suspension was supplied at the rate of 2 liters per hour, the sojourn time of the suspension in the apparatus consequently being of the order of about 5 minutes. The velocity gradient to which the suspension was subjected at the above-mentioned rotating speed was about 24,000 sec.$^{-1}$. The suspension emerging from the apparatus was found to have become so coarsely dispersed as to enable the dispersed solid phase to be rapidly separated from the aqueous phase by filtering. In this manner approximately 50 per cent of the polyvinyl chloride present in the initial suspension could be separated. The ash content (determined as sulfates) of the product obtained amounted to 0.2% by weight after washing and drying.

*Example II.*—An aqueous suspension of polyvinyl chloride of about 20% concentration, containing approximately 2% by weight of ion-active emulsifier, the stability of which suspension was, however, somewhat less than that of the suspension in Example I, was passed through the same apparatus at a throughput of 7 liters per hour under otherwise similar circumstances as in Example I. From the suspension emerging from the apparatus the coagulated polymer could be completely separated by filtration in the usual way over filter cloth. The ash content (determined as sulfates) of the washed and dried product was 0.3% by weight. At a throughput of 2 liters per hour the same result could be obtained by reducing the number of revolutions of the rotor to 700 per minute.

*Example III.*—An aqueous suspension of a copolymer of vinylidene chloride and methyl acrylate of 25% by weight concentration containing an ion-active emulsifier was passed through the same apparatus at the rate of 4 liters per hour at a temperature of 50° C. The number of revolutions of the rotor amounted to 1700 per minute. From the suspension emerging from the apparatus, the copolymer could be completely separated by filtering. The ash content of the product obtained amounted to 0.2% by weight.

We claim as our invention:

1. A process of increasing substantially the particle size of dispersed polyvinyl chloride particles having an average particle size of about 0.2 micron of a stable aqueous suspension of polyvinyl chloride of about 20 per cent concentration containing about 2 per cent of an organic emulsifying agent selected from the group consisting of anion-active and cation-active emulsifying agents, which process comprises flowing said suspension in the absence of an added coagulating agent and at a temperature between 50° C. and 100° C. through an annular shearing zone while maintaining in said shearing zone a high velocity gradient of the order of 24,000 sec.$^{-1}$ substantially transverse of the general direction of flow of the dispersion, said flow having a constant component of linear velocity along the general direction of flow, the suspension being passed through the shearing zone at a rate corresponding to a sojourn time therein of the order of 5 minutes whereby the particle size of the polyvinyl chloride is increased to at least about 4–6 microns.

2. A process of increasing substantially the particle size of dispersed polyvinyl chloride particles of a stable aqueous suspension of polyvinyl chloride as produced by emulsion polymerization of vinyl chloride and having an average particle size of about 0.2 micron, which suspension contains an organic emulsifying agent selected from the group consisting of anion-active and cation-active emulsifying agents as a stabilizating agent, which process comprises flowing said suspension in the absence of an added coagulating agent through a shearing zone while maintaining in said shearing zone a high velocity gradient of at least 10,000 sec.$^{-1}$ substantially transverse of the general direction of flow of the suspension.

3. A process of increasing substantially the particle size of dispersed copolymeric vinylidene chloride-methyl acrylate particles having an average particle size of about 0.2 micron of a stable aqueous suspension of a copolymer of vinylidene chloride and methyl acrylate of about 25% by weight concentration containing an organic emulsifying agent selected from the group consisting of anion-active and cation-active emulsifying agents, which process comprises flowing said suspension in the absence of an added coagulating agent through a shearing zone while maintaining in said shearing zone a high velocity gradient of at least 10,000 sec.$^{-1}$ substantially transverse of the general direction of flow of the suspension.

4. A process for increasing substantially the particle size of a mechanically stable aqueous dispersion of solid particles having an average particle size of substantially less than 4–6 microns, of a polymer of a vinyl chloride stably dispersed in an aqueous solution containing an effective stabilizing amount of an organic emulsifying agent selected from the group consisting of anion-active and cation-active emulsifying agents, which process comprises flowing said dispersion through an annular shearing zone while maintaining in said shearing zone a high velocity gradient of at least 5,000 sec.$^{-1}$ substantially transverse of the general direction of flow of the dispersion, the temperature of the dispersion in the shearing zone and the period of sojourn therein being maintained to increase the average particle size of the vinyl chloride polymer to at least 4–6 microns.

5. A process for increasing substantially the particle size of a mechanically stable aqueous dispersion of solid particles having an average particle size of about 0.2 micron, of a polymer of a vinyl chloride stably dispersed in an aqueous solution containing an effective stabilizing amount of an organic emulsifying agent selected from the group consisting of anion-active and cation-active emulsifying agents, which process comprises flowing said dispersion through a shearing zone while maintaining in said shearing zone a high velocity gradient of at least 10,000 sec.$^{-1}$, substantially transverse of the general direction of flow of the dispersion, the temperature of the dispersion in the shearing zone and its period of sojourn therein being maintained to increase the average particle size of the vinyl chloride polymer to at least 4-6 microns.

6. A process for increasing substantially the particle size of a mechanically stable aqeuous dispersion of solid particles having an average particle size of about 0.2 micron, of a polymer of a vinyl chloride in an aqueous solution in a concentration in the order of 20% by weight and containing an effective stabilizing amount of an organic emulsifying agent selected from the group consisting of anion-active and cation-active emulsifying agents, which process comprises flowing said dispersion in the absence of an added coagulating agent through an annular shearing zone while maintaining in said shearing zone a high velocity gradient of at least 10,000 sec.$^{-1}$ substantially transverse of the general direction of flow of the dispersion.

7. A process for increasing substantially the particle size of a mechanically stable aqueous dispersion of solid particles having an average particle size of about 0.2 micron, of a polymer of vinyl chloride stably dispersed in an aqueous solution containing an effective stabilizing amount of an organic emulsifying agent selected from the group consisting of anion-active and cation-active emulsifying agents, which process comprises flowing said dispersion through an annular shearing zone while maintaining in said shearing zone a high velocity gradient of at least 10,000 sec.$^{-1}$ substantially transverse of the general direction of flow of the dispersion.

8. A process for increasing substantially the particle size of a mechanically stable aqueous dispersion of solid particles having an average particle size of about 0.2 micron, selected from the group consisting of polyvinyl chloride polymers and vinylidene chloride-methyl acrylate copolymers stably dispersed in an aqueous solution containing an effective stabilizing amount of an organic emulsifying agent selected from the group consisting of anion-active and cation-active emulsifying agents, which comprises flowing said dispersion through a shearing zone while maintaining in said shearing zone a high velocity gradient of at least 5,000 sec.$^{-1}$ substantially transverse of the general direction of flow of the dispersion.

RUDOLF HERMAN METTIVIER MEYER.
JACOB DIJKSTRA.

REFERENCES CITED

The following references are of record in the file of this patent:

UNITED STATES PATENTS

| Number | Name | Date |
| --- | --- | --- |
| 1,496,641 | Hurrell | June 3, 1924 |
| 2,002,622 | Williams et al. | May 28, 1935 |
| 2,147,154 | Fikentscher | Feb. 14, 1939 |
| 2,386,674 | Flint et al. | Oct. 9, 1945 |

OTHER REFERENCES

Perry: Chemical Engineers' Handbook, 2nd ed. 1941 (McGraw Hill), pages 1893, 1917 to 1920.